United States Patent [19]
Oishi

[11] 4,096,538
[45] Jun. 20, 1978

[54] TAPE SUPPORT PINS IN MAGNETIC TAPE CASSETTE

[75] Inventor: Kengo Oishi, Odawara, Japan

[73] Assignee: Fuji Photo Film Co., Ltd., Japan

[21] Appl. No.: 796,389

[22] Filed: May 12, 1977

[30] Foreign Application Priority Data

May 18, 1976   Japan .............................. 51-63280[U]

[51] Int. Cl.² ............................................ G11B 23/10
[52] U.S. Cl. .................................... 360/132; 360/130;
226/196; 226/88; 242/199
[58] Field of Search ................... 360/130, 132, 93, 96;
242/76, 199; 226/196, 88

[56] References Cited
U.S. PATENT DOCUMENTS 3,143,270   8/1964   Cohen ............................... 242/76 X
3,889,900   6/1975   Nelson ............................... 242/76 X Primary Examiner—John H. Wolff

[57] ABSTRACT

In a magnetic tape cassette, closely spaced support pins for guiding and holding a magnetic recording tape in contact with a recording and reproducing head are provided with a V-shaped concave guide surface. The V-shaped guide surface of each support pin bends the tape along its transverse axis when the head is inserted into the cassette and the tape is pressed thereon, thereby aligning the center of the tape with the center of the guide surface so that the tape is always maintained in a predetermined position with respect to the magnetic head, at the same time increasing the stiffness of the tape portion between the pins. The pins at their rear face also support a spring plate having a pad to contact the tape.

1 Claim, 3 Drawing Figures

TAPE SUPPORT PINS IN MAGNETIC TAPE CASSETTE

BACKGROUND OF THE INVENTION

1. Field of the Invention

This invention relates to a cassette tape magazine, and more particularly to a magnetic tape cassette having an improved structure to stably feed a magnetic recording tape.

2. Description of the Prior Art

Generally a magnetic tape cassette includes a hollow plastic casing composed of lower and upper halves coupled together to provide a space for accommodating a magnetic recording tape therein. In the space, there are provided a pair of flat base plates or friction sheets between which a pair of cores are rotatably mounted. The magnetic recording tape is wound on the cores and is fed from one core to the other. The tape is guided by a pair of fixed guide pins and a pair of rotatable guide rollers which are vertically mounted in the casing. Furthermore, the flat base plates serve to guide the lower and upper side edges of the tape. In the front face of the casing, there is provided an opening through which a recording and reproducing head of a tape recorder is inserted. On the opposite sides of the opening are provided a pair of vertical support pins which cooperate to hold the tape in contact with the magnetic head when the head is inserted through the opening. Between the pair of support pins is provided a pad which is supported on a spring plate and against which the magnetic recording tape is pressed by the head. In order to obtain good quality reproduction, the magnetic tape must run in contact with the head at a suitable pressure and at a predetermined position with respect to the head. When the tape is not in contact with the magnetic head at a sufficient pressure, or when the tape is moved out of its predetermined position with respect to the head, the frequency characteristics and other input-to-output relationships are changed.

Since said plastic casing and guiding means are assembled by means of screws or ultrasonic welding, it is very difficult to fix the flat base plates in exactly flat positions or to mount the fixed guide pins and the rotatable guide rollers in exactly vertical positions. Therefore, the tape is liable to move in the direction of its transverse axis with respect to the head while the tape runs.

In a conventional magnetic tape cassette, said guiding means such as the guide pins and the guide rollers, and the pair of support pins, have straight surfaces and therefore do not function to keep the tape running in its predetermined desirable position.

The movement or deflection of the tape in the transverse direction thereof may occur when the position of the tape cassette changes, e.g. from a vertical position to a horizontal position. Furthermore, a displacement of the tape with respect to the head also occurs when the tape cassette is turned over to change the track of the tape in recording or reproduction.

Furthermore, the thinner the tape, the more frequently the lateral movement of the tape occurs. In order to reduce the size of the magnetic tape cassette, it is desirable that the magnetic recording tape be as thin as possible.

Accordingly, there is a great demand for a magnetic tape cassette in which even an extremely thin tape such as C-120 type and C-180 type can be stably fed without any deflection of the tape.

SUMMARY OF THE INVENTION

In light of the foregoing observations and description, the primary object of the present invention is to provide a magnetic tape cassette in which a magnetic recording tape, even if it is extremely thin, can be stably fed in a predetermined position with respect to a recording and reproducing head of a tape recorder.

Another object of the present invention is to provide a magnetic tape cassette in which a magnetic tape is pressed against a recording or reproducing magnetic head at a constant pressure while the tape is being fed in the recording or reproducing operation.

The magnetic tape cassette in accordance with the present invention is characterized in that a pair of support pins having a concave guide surface are disposed on opposite sides of the opening of the cassette through which the magnetic head of the tape recorder is inserted.

The concave surface of the support pin serves to keep the center of the magnetic recording tape at a predetermined position. More specifically, the center of the tape is aligned with the middle point of the concave surface of the support pins so that the predetermined proper position of the tape with respect to the head is always maintained.

Furthermore, when the head is inserted through the opening and the tape is pressed against the support pins, the tape is curved along its transverse axis by the concave surfaces of the support pins, which results in an increased stiffness of the tape against the force applied normal to the surface thereof. Accordingly, the tape is put into sufficient contact with the magnetic head.

DESCRIPTION OF THE PREFERRED EMBODIMENTS

Preferred embodiments of the present invention will now be described in detail with reference to FIGS. 1 to 3.

Figure 1:
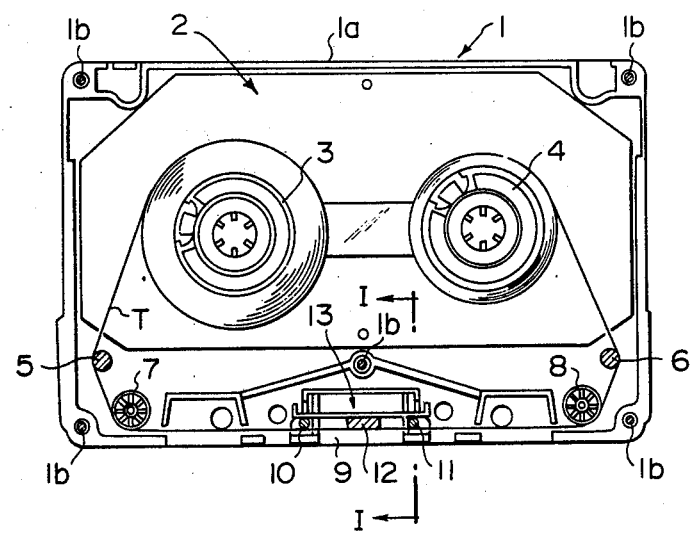
FIG. 1 is a plan view of a magnetic tape cassette in accordance with an embodiment of the present invention with the upper half of the casing thereof removed to show the gunning path of the magnetic recording tape.

FIG. 1 shows a typical magnetic tape cassette. In FIG. 1, an upper half of the casing 1 is removed to show the internal structure of the cassette. The magazine includes a casing 1 which consists of a lower half 1a and an upper half (not shown) coupled together by means of screws 1b. To the lower half 1a is secured a flat base plate 2. The upper half of the casing 1 also includes a similar flat base plate. A core 3 and a core 4 are rotatably mounted between the flat base plates. A magnetic recording tape T is wound on the cores and is fed from one core to the other. The tape T is guided by a pair of vertical fixed guide pins 5 and 6, and a pair of rotatable guide rollers 7 and 8 so as to pass over an opening 9 provided on the front face of the casing 1 through which a recording or reproducing head (not shown) of a tape recorder is inserted for recording or reproducing operations. The flat base plates also serve to guide the lower and upper side edges of the tape T. A pair of vertical support pins 10 and 11 are fixed on opposite sides of the opening 9 and cooperate to support the tape T and hold it in contact with the head. Between the pair of support pins 10 and 11 is provided a pad 12 which is supported on a spring plate 13 and against which the magnetic tape T is pressed by the head.

It is desired that the tape be guided along a predetermined passage in contact with the magnetic head with a predetermined pressure which is inserted into the casing of the tape cassette. It will be noted that spring plate 13 is a small fraction of the length of the casing 1, and that pins 10 and 11 are disposed in front of said spring plate 13 for holding said plate at the rear faces thereof. The pins 10 and 11 are located at a distance from each other which is less than the length of said plate so as to be closely spaced.

The magnetic tape cassette in accordance with the present invention is characterized in that each of said pair of support pins 10 and 11 is provided with a concave surface on one side thereof.

Figure 2:
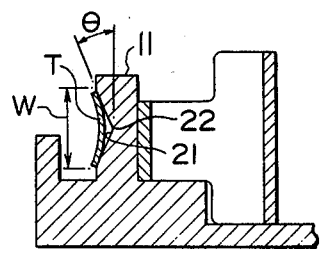
FIG. 2 is a fragmentary enlarged cross sectional view taken along line I—I of FIG. 1 which illustrates a support pin in detail.

FIG. 2 shows an example of a support pin which can be employed in the present invention. As shown in FIG. 2, the support pin 11 includes a V-shaped surface 21 on one side thereof.

When a magnetic head of a tape recorder is inserted through the opening, the tape T is pressed against the V-shaped surfaces 21 of the support pins 10 and 11 and is bent generally along the V-shaped surface 21. The intermediate portion of the tape between the support pins 10 and 11 is bent to the same degree as that of the curvature of the tape portions which are in contact with the support pins since the support pins are close to each other. Accordingly, the stiffness of the portion of the tape extending between the pins in contact with the magnetic head is uniformly increased, so that the tape is pressed on the magnetic head with a relatively high predetermined pressure. At the same time, when the running tape is bent by the concave surfaces of the support pins, the tape is subjected to a force by the concave surfaces which makes the center line of the tape aligned with the middle point of the concave surfaces. Therefore the center of the tape is aligned with the center 22 of the V-shaped surface 21 so that the tape T would be returned to its predetermined proper running position if the tape T should be laterally displaced, and the tape runs along a predetermined passage in contact with the magnetic heads.

The width or the height W of the V-shaped surface is about equal to the width of the tape T. The angle $\theta$ of the surface 21 with respect to the central axis of the pin 11 is selected within a range of between 0.2°–10° depending upon the thickness of the tape T.

With the V-shaped surface 21, the pin 11 serves to keep the tape T running in a predetermined position with respect to the magnetic head as mentioned above. The V-shaped surface 21 of the pin 11 also serves to increase the stiffness of the tape T against the force applied thereto normal to its surface by bending the tape, whereby the tape T is put into sufficiently strong contact with the head.

The support pins may be made of a hard plastic material such as a polyacetal resin or a nonmagnetic metal.

Figure 3:
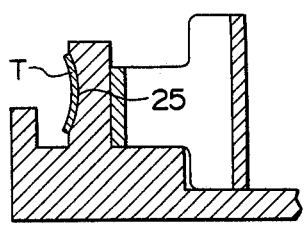
FIG. 3 is a fragmentary enlarged cross sectional view similar to FIG. 2 which illustrates a support pin employed in another embodiment of the present invention.

The concave surface of the support pin may be a cylindrically curved surface 25 as shown in FIG. 3. In this modification, the width of the surface 25 is also equal to the width of the tape T. The curvature of the surface 25 is selected in a manner as described in connection with the FIG. 2. The support pin of this modification is especially suitable for a tape which is extremely thin and is liable to wrinkle.

It should be noted that although the present invention has been described hereinabove only in connection with a magnetic tape cassette having a pair of cores for feeding out and taking up the tape, the present invention may be applied to a magnetic tape cassette having a single feed-out and take-up core like an endless magnetic tape cassette.

I claim:

1. In magnetic tape cassette including a hollow casing having an opening on the front face thereof through which a recording or reproducing magnetic head of a tape recorder is inserted, a pair of cores rotatably mounted within said hollow casing, a magnetic tape wound on said cores and fed from one core to the other, a pair of rotatable guide rollers for guiding the tape from one core to the other by way of the opening, a spring plate having a length which is a small fraction of the length of said casing disposed to face the opening, and a pad provided on the front face of the spring plate to contact the tape passing over the opening of the casing, the improvement comprising a pair of tape support pins disposed at a distance from each other which is less than the length of said plate so as to be closely spaced, said pins being located on opposite sides of the opening for holding the spring plate at the rear face thereof and supporting and guiding the tape passing over the opening at the front face thereof, each of said support pins being provided with a concave guide surface on the front face thereof which is adapted to matingly engage the flexible tape and thus provides means for self-centering said tape and in conjunction with the close spacing of the pins to increase the stiffness of the tape by bending the same along its transverse axis and to guide the tape along a predetermined passage in contact with a magnetic head which is inserted into the casing.

* * * * *